United States Patent
Sasaki et al.

(10) Patent No.: US 9,215,618 B2
(45) Date of Patent: Dec. 15, 2015

(54) RADIO COMMUNICATION SYSTEM AND BASE STATION

(71) Applicant: NTT DOCOMO, INC., Tokyo (JP)

(72) Inventors: Yusuke Sasaki, Tokyo (JP); Kazunori Obata, Tokyo (JP); Seigo Harano, Tokyo (JP); Shogo Yabuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/366,202

(22) PCT Filed: Dec. 3, 2012

(86) PCT No.: PCT/JP2012/081288
§ 371 (c)(1),
(2) Date: Jun. 17, 2014

(87) PCT Pub. No.: WO2013/128742
PCT Pub. Date: Sep. 6, 2013

(65) Prior Publication Data
US 2015/0003254 A1    Jan. 1, 2015

(30) Foreign Application Priority Data
Feb. 28, 2012   (JP) .................. 2012-041333

(51) Int. Cl.
*H04L 12/26* (2006.01)
*H04W 28/08* (2009.01)
*H04M 7/00* (2006.01)
*H04W 24/10* (2009.01)
*H04W 28/02* (2009.01)
*H04W 48/16* (2009.01)
*H04W 76/02* (2009.01)

(52) U.S. Cl.
CPC .............. *H04W 28/08* (2013.01); *H04M 7/006* (2013.01); *H04W 24/10* (2013.01); *H04W 28/0289* (2013.01); *H04W 48/16* (2013.01); *H04W 76/02* (2013.01)

(58) Field of Classification Search
None
See application file for complete search history.

(56) References Cited

U.S. PATENT DOCUMENTS

| 2005/0107091 A1* | 5/2005 | Vannithamby | H04W 28/08 455/453 |
| 2010/0067442 A1* | 3/2010 | Van der Wal | H04W 92/20 370/328 |
| 2010/0220652 A1* | 9/2010 | Ishii | H04L 5/0007 370/328 |

(Continued)

FOREIGN PATENT DOCUMENTS

JP    10-41980 A    2/1998

OTHER PUBLICATIONS

International Search Report for corresponding International Application No. PCT/JP2012/081288, mailed Feb. 26, 2013 (4 pages).

*Primary Examiner* — Otis L Thompson, Jr.
(74) *Attorney, Agent, or Firm* — Osha Liang LLP (57) ABSTRACT

A radio communication system includes at least one user equipment, base stations, and a control station. After expiration of the timer started after establishment of the data bearer, the base station selects the access point base station for the user equipment on the basis of the voice congestion levels and indicates the access point base station to the user equipment if the voice bearer has been established, and selects the access point base station for the user equipment on the basis of the data congestion levels and indicates the access point base station to the user equipment if the voice bearer has not been established.

8 Claims, 8 Drawing Sheets

(56) References Cited

U.S. PATENT DOCUMENTS

| | | | |
|---|---|---|---|
| 2012/0226532 A1* | 9/2012 | Prabhakar | G06Q 30/02 705/14.14 |
| 2012/0257503 A1* | 10/2012 | Vrbaski | H04W 28/0205 370/235 |
| 2013/0051331 A1* | 2/2013 | Bao | H04W 28/24 370/329 |
| 2013/0188484 A1* | 7/2013 | Aksu | H04L 47/32 370/235 |
| 2013/0194937 A1* | 8/2013 | Sridhar | H04L 47/24 370/252 |
| 2014/0248914 A1* | 9/2014 | Aoyagi | H04W 48/08 455/458 |

* cited by examiner

RADIO COMMUNICATION SYSTEM AND BASE STATION

FIELD OF THE INVENTION

The present invention relates to a radio communication system and to a base station.

BACKGROUND ART

Recently, radio communication systems have been in widespread use for executing wireless communication by cell phones (user terminals). In radio communication systems, usually, voice communication is carried out through a circuit-switching network, whereas data communication is carried out through a packet switching network (for example, see Patent Document 1).

On the other hand, a technology is proposed for executing both voice communication and data communication (non-voice data communication) through a single packet switching network (IP network). In this technology, not only normal data (non-voice data), but also voice data (data indicating voice signals) is transformed into packets and is then transmitted.

RELATED ART DOCUMENTS

Patent Documents

Patent Document 1: JP-A-10-41980

SUMMARY OF THE INVENTION

According to the technology in Patent Document 1, voice communication and data communication are carried out through separate networks. Consequently, communication control is possible for each type of communication (voice communication and data communication) by controlling the communication depending on the communication status in each network. On the other hand, according to the technology in which voice communication and data communication are executed through a single packet switching network, communication is carried out by exchanging packets, regardless of type of communication. Consequently, it is not easy to distinguish the type of communication, and thus, it is difficult to carry out communication control depending on the type of communication.

Accordingly, it is an object of the present invention to provide a radio communication system and a base station for enabling communication control depending on the type of communication (voice communication and data communication).

A radio communication system according to the present invention is a radio communication system including: at least one user equipment configured to execute voice communication and data communication by exchanging packets; multiple base stations each configured to execute wireless communication with the user equipment; and a control station configured to control establishment of bearers and sessions used for communication of the user equipment executed via the base stations. The base station includes: a radio communicator configured to execute radio communication with the user equipment; a network communicator configured to execute communication with the control station and another base station; a congestion level determiner configured to determine a voice congestion level indicating a degree of congestion of voice communication in the base station, and to determine a data congestion level indicating a degree of congestion of data communication in the base station; a bearer establisher configured to establish a data bearer to be used for data communication and a voice bearer to be used for voice communication on the basis of control by the control station; a waiting timer section configured to start a timer after establishment of the data bearer, the timer expiring after passage of a predetermined time; and an access point controller configured to select an access point base station for the user equipment on the basis of the congestion level in the base station and the congestion level in another base station, and to indicate the access point base station to the user equipment. The control station is configured to, when the user equipment executes voice communication, start voice communication session for the user equipment after the bearer establisher of the base station establishes the data bearer, and to control the bearer establisher of the base station to establish the voice bearer after starting the voice communication session. The access point controller of the base station is configured to, after expiration of the timer started by the waiting timer section, select the access point base station for the user equipment on the basis of the voice congestion levels and indicate the access point base station to the user equipment if the voice bearer has been established. The access point controller of the base station is configured to, after expiration of the timer started by the waiting timer section, select the access point base station for the user equipment on the basis of the data congestion levels and indicate the access point base station to the user equipment if the voice bearer has not been established.

With such a structure, when the user equipment executes voice communication, the access point base station is selected in accordance with voice congestion levels, whereas when the user equipment executes data communication, the access point base station is selected in accordance with data congestion levels. In other words, depending on the type of communication (voice communication and data communication), the access point base station for the user equipment is selected. Therefore, the throughput in the radio communication system may be enhanced. In addition, by virtue of waiting for voice bearer establishment with the use of the waiting timer, it is possible to prevent multiple inter-cell handovers that might occur before and after the voice bearer establishment and to prevent an inter-cell handover that might occur at the start of voice communication session. As a result, call disconnection can be limited.

In a preferred embodiment of the present invention, the multiple base stations include a first base station configured to execute wireless communication with the user equipment at a first frequency and a second base station configured to execute wireless communication with the user equipment at a second frequency. Each of the base stations includes a measurement instructor configured to instruct the user equipment wirelessly connected to the base station to measure reception quality from at least one base station. The measurement instructor of the first base station is configured to instruct the user equipment wirelessly connected to the first base station to measure reception quality of radio waves at the second frequency corresponding to the second base station in a case in which the congestion level in the second base station is lower than that in the first base station. The measurement instructor of the first base station is configured to instruct the user equipment wirelessly connected to the first base station to report the reception quality to the first base station in a case in which the reception quality is in excess of a predetermined threshold. The user equipment is configured to measure the reception quality of radio waves at the second frequency in accordance with instruction by the measurement instructor, and to report the reception quality to the first base station in a case in which the reception quality is in excess of the predetermined threshold. The access point controller of the first base station is configured to select the second base station as the access point base station for the user equipment and to indicate the second base station to the user equipment in a case in which the first base station receives the report of the reception quality.

In this embodiment, the first base station and the second base station may be constructed as different base station apparatuses, or as a single apparatus including the functions of the first base station and the functions of the second base station.

With such a structure, since the user equipment reports the reception quality to the first base station only when the measured reception quality is in excess of the predetermined threshold, the amount of uplink radio communication for reporting is restricted in comparison with the structure in which user equipment always report the measured reception quality to the first base station. Therefore, power consumption at the user equipment can be reduced.

In a preferred embodiment of the present invention, the first frequency and the second frequency are different.

In the specification, "the first frequency and the second frequency are different" is meant to include the ideas that the first frequency and the second frequency are different in both the center frequency and the frequency band and that the first frequency and the second frequency are the same in the frequency band, but are different in the center frequency. For example, the structure in which the band of the first frequency and the band of the second frequency are commonly the 2 GHz band, but in which the center frequency (for example, 2130 MHz) of the first frequency is different from the center frequency (for example, 2140 MHz) of the second frequency is within the above-described embodiment.

In a preferred embodiment of the present invention, the predetermined time that the timer expires is determined in accordance with a time period that is necessary for establishment of the voice bearer after the establishment of the data bearer.

A base station of the present invention is a base station in a radio communication system including: at least one user equipment configured to execute voice communication and data communication by exchanging packets; multiple base stations each configured to execute wireless communication with the user equipment; and a control station configured to control establishment of bearers and sessions used for communication of the user equipment executed via the base stations. The base station includes: a radio communicator configured to execute radio communication with the user equipment; a network communicator configured to execute communication with the control station and another base station; a congestion level determiner configured to determine a voice congestion level indicating a degree of congestion of voice communication in the base station, and to determine a data congestion level indicating a degree of congestion of data communication in the base station; a bearer establisher configured to establish a data bearer to be used for data communication and a voice bearer to be used for voice communication on the basis of control by the control station; a waiting timer section configured to start a timer after establishment of the data bearer, the timer expiring after passage of a predetermined time; and an access point controller configured to select an access point base station for the user equipment on the basis of the congestion level in the base station and the congestion level in another base station, and to indicate the access point base station to the user equipment. The bearer establisher is configured to, when the user equipment executes voice communication, establish the voice bearer on the basis of control by the control station executed after establishment of the data bearer and starting voice communication session for the user equipment. The access point controller is configured to, after expiration of the timer started by the waiting timer section, select the access point base station for the user equipment on the basis of the voice congestion levels and indicate the access point base station to the user equipment if the voice bearer has been established. The access point controller is configured to, after expiration of the timer started by the waiting timer section, select the access point base station for the user equipment on the basis of the data congestion levels and indicate the access point base station to the user equipment if the voice bearer has not been established.

In a preferred embodiment of the present invention, the base station is a first base station among a first base station and a second base station, wherein the first base station is configured to execute wireless communication with the user equipment at a first frequency and the second base station is configured to execute wireless communication with the user equipment at a second frequency. The base station includes a measurement instructor configured to instruct the user equipment wirelessly connected to the base station to measure reception quality from at least one base station. The measurement instructor is configured to instruct the user equipment wirelessly connected to the first base station to measure reception quality of radio waves at the second frequency corresponding to the second base station in a case in which the congestion level in the second base station is lower than that in the first base station, the measurement instructor configured to instruct the user equipment wirelessly connected to the first base station to report the reception quality to the first base station in a case in which the reception quality is in excess of a predetermined threshold. The access point controller is configured to select the second base station as the access point base station for the user equipment and to indicate the second base station to the user equipment in a case in which the base station receives the report of the reception quality.

In a preferred embodiment of the present invention, the first frequency and the second frequency are different.

In a preferred embodiment of the present invention, the predetermined time that the timer expires is determined in accordance with a time period that is necessary for establishment of the voice bearer after the establishment of the data bearer.

DESCRIPTION OF EMBODIMENTS

Figure 1:
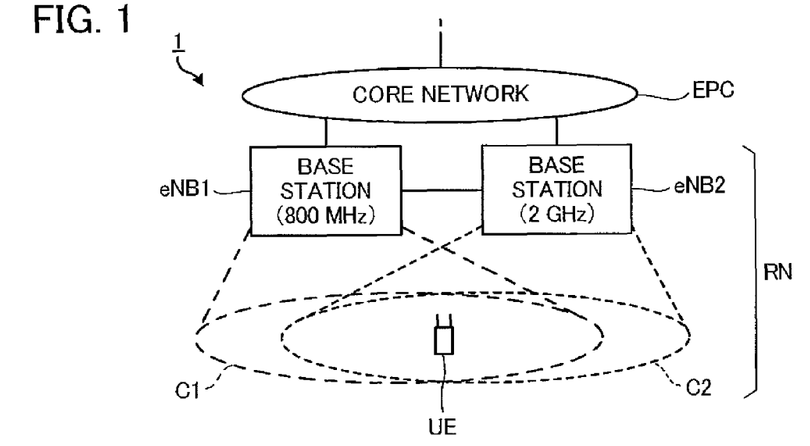
FIG. 1 is a schematic view showing a radio communication system 1 according to an embodiment of the present invention.

1. Structure of Radio Communication System 1-1. Outline Structure of Radio Communication System FIG. 1 is a block diagram showing a radio communication system 1 according to an embodiment of the present invention. The radio communication system 1 includes at least one user equipment UE, multiple base stations eNB, and a core network EPC. The user equipment UE is a user equipment stipulated in the standards (Release 8 or later) of the 3GPP (Third Generation Partnership Project), and is capable of carrying out voice communication and data communication by exchanging packets. The base station eNB is an evolved base station (evolved Node B) stipulated in the standards of the 3GPP, and is capable of communicating with the user equipment UE wirelessly. The multiple base stations eNB are interconnected via X2 interface. The user equipment UE and the base stations eNB constitute a radio network RN. The radio network RN is an E-UTRAN (Evolved Universal Terrestrial Radio Access Network) operating in compliance with specifications of the LTE (Long Term Evolution) stipulated in the standards of the 3GPP.

The multiple base stations eNB include a first base station eNB1 capable of communicating wirelessly with the user equipment UE at the 800 MHz frequency band and a second base station eNB2 capable of communicating wirelessly with the user equipment UE at the 2 GHz frequency band. The first base station eNB1 forms a first cell C1, whereas the second base station eNB2 forms a second cell C2. Each cell C is a range to which radio waves from the base station eNB can effectively arrive. Therefore, the user equipment UE in the cell C can execute radio communication with the base station eNB corresponding to the cell C.

The core network EPC is an evolved packet core stipulated in the standards of the 3GPP, and operates in compliance with specifications of the SAE (System Architecture Evolution) stipulated in the standards of the 3GPP. The core network EPC includes multiple types of nodes, such as a control station MME and a gateway GW that will be described later.

As will be understood from the above description, the radio communication system 1 including the radio network RN and the core network EPC is an evolved packet system (EPS) stipulated in the standards of the 3GPP.

Figure 2:
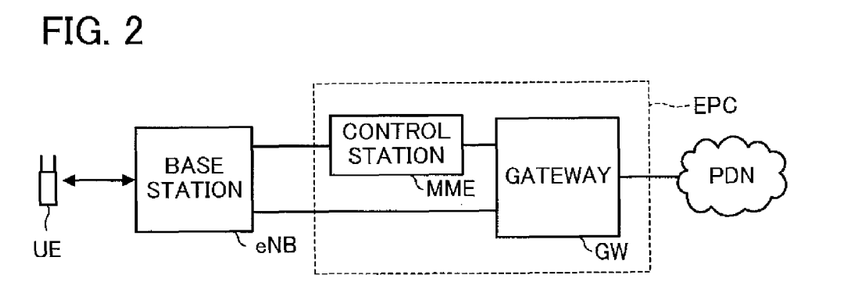
FIG. 2 is a view showing connection of elements in the radio communication system.

FIG. 2 is a view showing connection of elements in the radio communication system 1. The core network EPC includes a control station MME and a gateway GW. The control station MIME is a mobility management entity stipulated in the standards of the 3GPP, and is connected to the base stations eNB and the gateway GW. The control station MME is capable of controlling establishment of bearers and sessions used for communication of the user equipment UE through the base station eNB. The gateway GW is an SAE gateway stipulated in the standards of the 3GPP, and is connected to the base station eNB, nodes in the core network EPC (such as the control station MME), and a packet data network PDN located outside the core network EPC. The packet data network PDN is an external network (for example, the Internet) operating in compliance with the IP (Internet Protocol). The gateway GW is capable of routing user packets transmitted to or received by the user equipment UE. The gateway GW may be constructed as a single SAE gateway, or it may be constructed of multiple nodes, such as an S-GW (serving gateway) and a P-GW (packet data network gateway) stipulated in the standards of the 3GPP.

1-2. Structure of User Equipment

Figure 3:
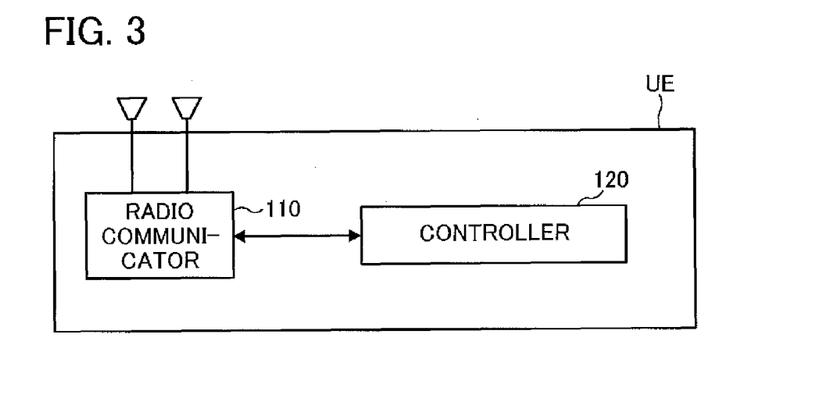
FIG. 3 is a view showing the structure of a user equipment according to an embodiment of the present invention.

FIG. 3 is a block diagram for showing the structure of a user equipment UE according to an embodiment of the present invention. The user equipment UE includes a radio communicator 110 and a controller 120. The radio communicator 110 is an element for communicating wirelessly with the base stations eNB (eNB1 and eNB2), and includes transceiving antennas; an reception circuit for receiving radio waves from the base station eNB, for converting the radio waves to electrical signals, and for supplying the electrical signals to the controller 120, and a transmission circuit for converting electrical signals supplied from the controller 120 to radio waves and for transmitting the radio waves. The controller 120 is capable of measuring reception quality of radio waves from each base station eNB, and reporting the reception quality to the base station eNB via the radio communicator 110. The controller 120 is a functional block accomplished by the fact that a CPU (central processing unit, not shown) in the user equipment UE executes a computer program and operates in accordance with the computer program.

1-3. Structure of Base Station

Figure 4:
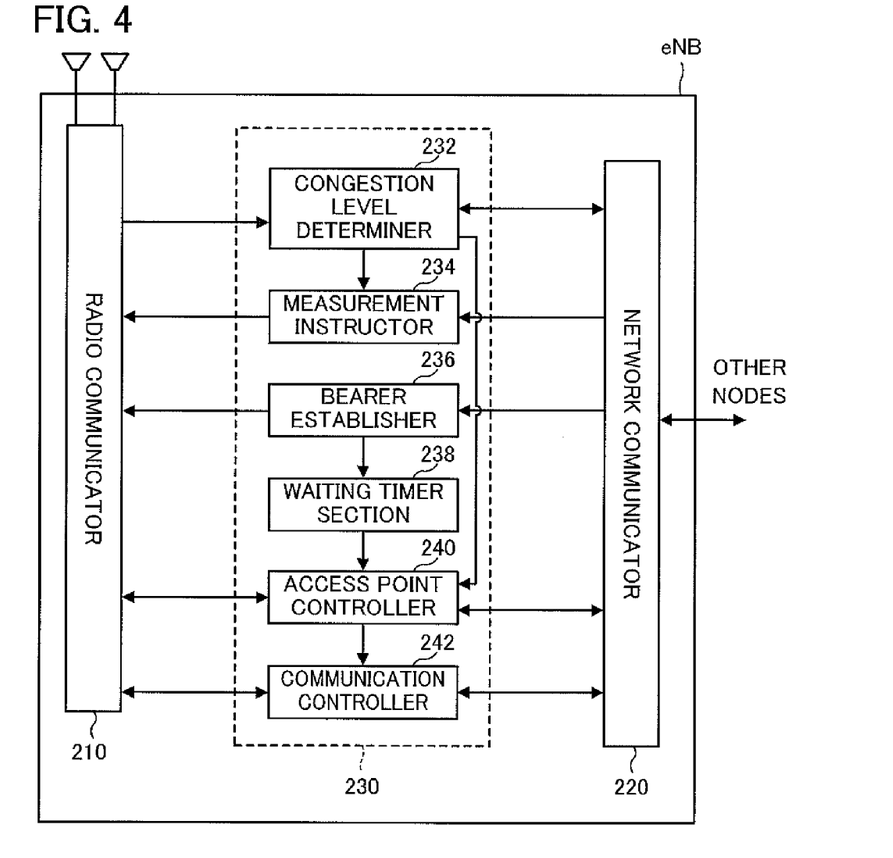
FIG. 4 is a view showing the structure of a base station according to an embodiment of the present invention.

FIG. 4 is a block diagram for showing the structure of a base station eNB according to an embodiment of the present invention. The base station eNB includes a radio communicator 210, a network communicator 220, and a controller 230. The radio communicator 210 is an element for communicating wirelessly with the user equipment UE, and includes transceiving antennas; an reception circuit for receiving radio waves from the user equipment UE, for converting the radio waves to electrical signals, and for supplying the electrical signals to the controller 230, and a transmission circuit for converting electrical signals supplied from the controller 230 to radio waves and for transmitting the radio waves. The network communicator 220 is an element for communicating with another base station eNB, the control station MME, the gateway GW, etc., supplies electrical signals received from aforementioned other nodes to the controller 230, and transmits electrical signals supplied from the controller 230 to aforementioned other nodes.

The controller 230 includes a congestion level determiner 232, a measurement instructor 234, a bearer establisher 236, a waiting timer section 238, an access point controller 240, and a communication controller 242. The congestion level determiner 232 determines a voice congestion level indicating a degree of congestion of voice communication in the base station eNB, and determines a data congestion level indicating a degree of congestion of data communication in the base station eNB. The measurement instructor 234 instructs the user equipment UE wirelessly connected to the base station eNB to measure the reception quality of radio waves at each frequency transmitted from the base station eNB. On the basis of control by the control station MME, the bearer establisher 236 establishes a data bearer to be used for data communication and a voice bearer to be used for voice communication. The waiting timer section 238 starts a timer after establishment of the data bearer, the timer expiring after passage of a predetermined time T. The access point controller 240 selects an access point base station TeNB for the user equipment UE on the basis of the congestion level in the base station eNB and the congestion level in another base station, and indicates the access point base station to the user equipment UE. However, operations executed by the controller 230 are not limited to the operations of the elements described above.

A bearer is a logical communication path for exchanging packets between the user equipment UE and the gateway GW. In this embodiment, data packets (non-voice packets) are exchanged through a data bearer, whereas voice packets are exchanged through a voice bearer. Packets transmitted from the user equipment UE via the bearer to the gateway GW are transferred from the gateway GW to the target node in the packet data network PDN. Packets transmitted from a node in the packet data network PDN and destined for the user equipment UE are transferred from the gateway GW via the bearer to the user equipment UE.

Each bearer (data bearer or voice bearer) is characterized by a different quality of service (QoS). The QoS includes, for example, the data transmission rate, the permissible delay, and the permissible bit error rate (BER).

The controller 230 and the congestion level determiner 232, the measurement instructor 234, the bearer establisher 236, the waiting timer section 238, the access point controller 240, and the communication controller 242 included in the controller 230 are functional blocks accomplished by the fact that a CPU (not shown) in the base station eNB executes a computer program and operates in accordance with the computer program.

1-4. Structure of Control Station

Figure 5:
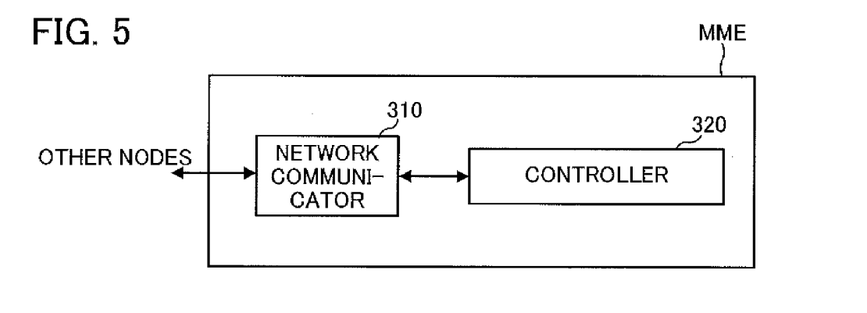
FIG. 5 is a view showing the structure of a control station according to an embodiment of the present invention.

FIG. 5 is a block diagram showing the structure of the control station MME according to an embodiment of the present invention. The control station MIME includes a network communicator 310 and a controller 320. The network communicator 310 is an element for communicating with the base stations eNB and the gateway GW, etc., and exchanges electrical signals with the aforementioned nodes. The controller 320 controls, via the network communicator 310, the base station eNB for establishment of the bearers (the data bearer and the voice bearer). The controller 320 is a functional block accomplished by the fact that a CPU (central processing unit, not shown) in the control station MME executes a computer program and operates in accordance with the computer program.

2. Operations of Radio Communication System 2-1. Establishment of Data Bearer

Figure 6:
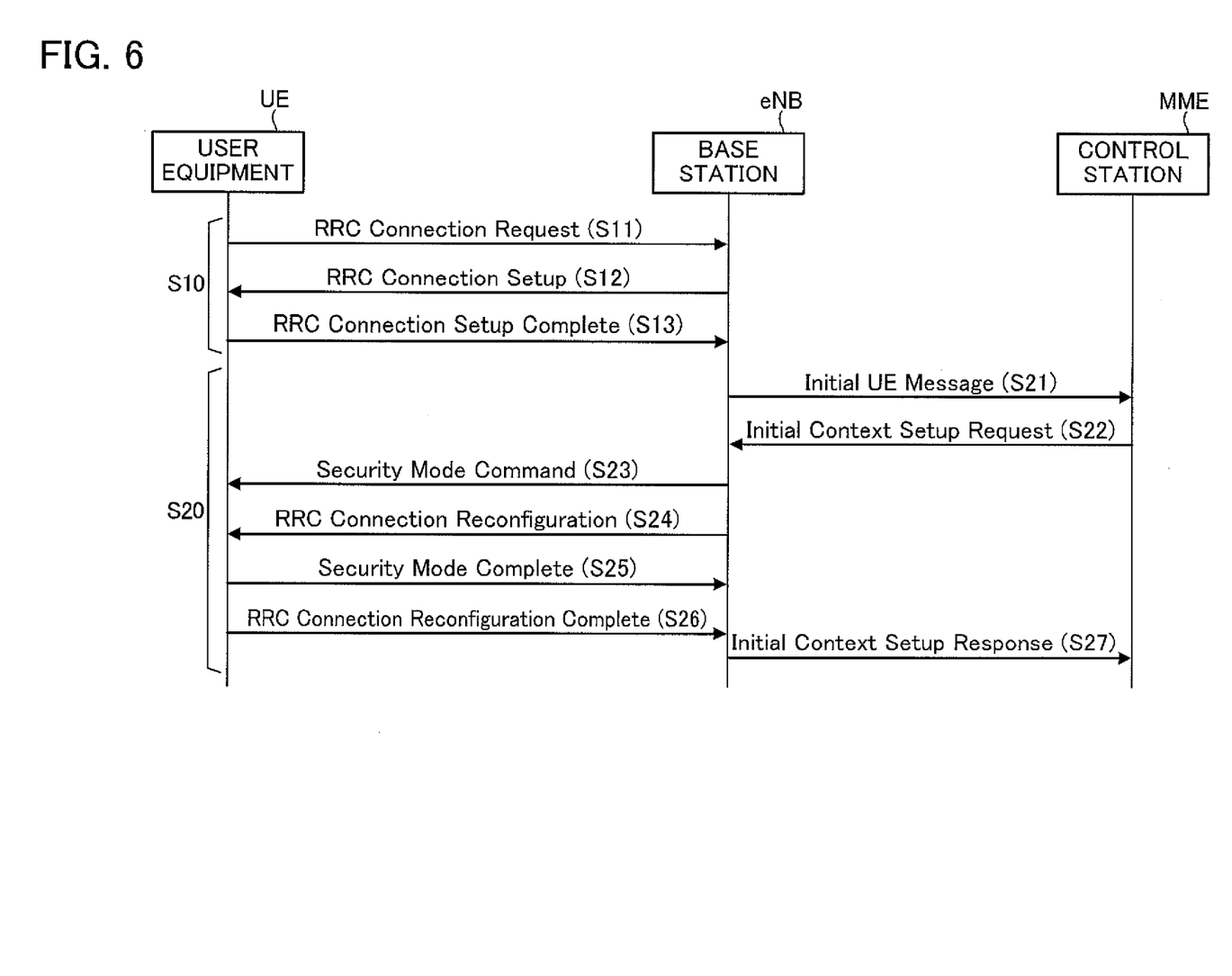
FIG. 6 is a sequence diagram showing an operation for bearer establishment executed at the start of data communication.

With reference to FIG. 6, operations for establishing a bearer executed when data communication is started will be described. For data communication, only the data bearer need be established, and establishment of a voice bearer is not necessary.

Prior to the establishment of the data bearer, the RRC (Radio Resource Control) connection is established at step S10. Specifically, the user equipment UE that will start data communication sends an RRC connection Request message containing the identifier of the user equipment UE and other information to the base station eNB in order to request establishment of an RRC connection (S11). Upon receiving the RRC connection Request message, the base station eNB sends an RRC connection Setup message to the user equipment UE when the request is allowed (S12). Upon receiving the RRC connection Setup message, the user equipment UE sends an RRC connection Setup Complete message to the base station eNB (S13). By the sequence described above, an RRC connection between the user equipment UE and the base station eNB is established. This sequence is described in the 3GPP specifications (for example, 3GPP TS 36.331 V10.3.0 (2011 September)).

After the establishment of the RRC connection, at step S20, the data bearer is established. Specifically, the base station eNB sends an Initial HE message to the control station MIME in order to establish the data bearer (S21). Upon receiving the Initial UE message, the control station MME sends an Initial Context Setup Request message to the base station eNB, so as to control the establishment of the data bearer (S22). Upon receiving the Initial Context Setup Request message, the base station eNB sends a Security Mode Command message for setting the security mode and an RRC connection Reconfiguration message (details of which will be given below) for setting radio resource control to the user equipment UE (S23 and S24). The user equipment UE sets the security mode of the user equipment UE itself in accordance with the Security Mode Command message, and updates radio resource control settings of the user equipment UE itself. Then, the user equipment UE sends a Security Mode Complete message and an RRC connection Reconfiguration Complete message to the base station eNB for reporting the completion of the settings (S25 and S26). Upon receiving the Security Mode Complete message and the RRC connection Reconfiguration Complete message, the base station eNB sends an Initial Context Setup Response message to the control station MME (S27), and the establishment of the data bearer is completed. This sequence is described in the 3GPP specifications (for example, 3GPP TS 36.331 V10.3.0 (2011 September) and 3GPP TS 36.413 V10.4.0 (2011 December).

After completion of the establishment of the data bearer, the user equipment UE starts transmission of data (non-voice data packet) to the gateway GW via the data bearer.

2-2. Establishment of Voice Bearer

Figure 7:
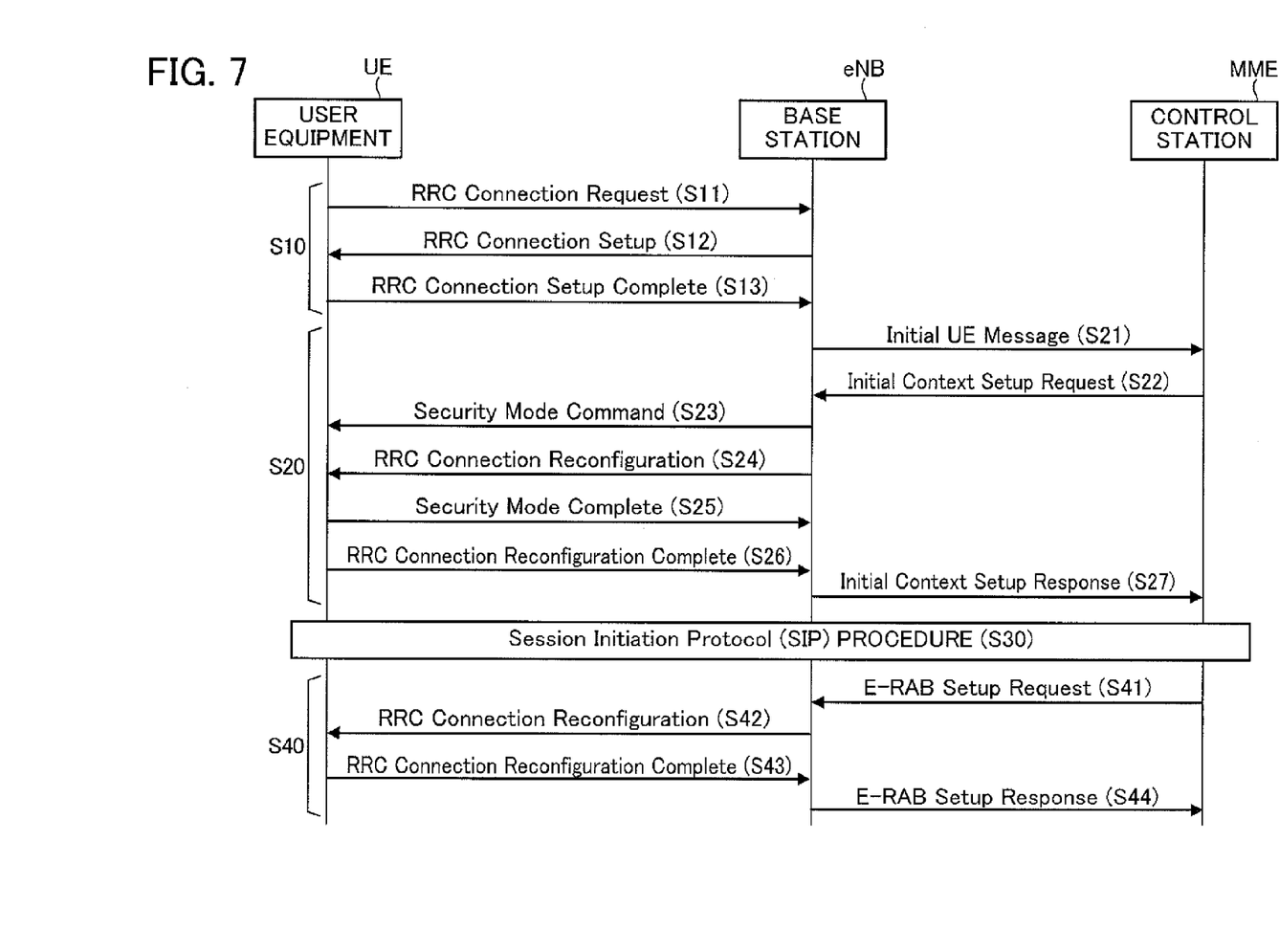
FIG. 7 is a sequence diagram showing an operation for bearer establishment executed at the start of voice communication.

With reference to FIG. 7, operations for establishing bearers executed when voice communication is started will be described.

For voice communication, both the data bearer and the voice bearer need to be established. In order to establish the voice bearer (step S40 that will be described below), it is necessary to already start a voice communication session for the user equipment UE in accordance with the Session Initiation Protocol (SIP) (step S30 that will be described below). In order to start a voice communication session in accordance with the SIP procedure, it is necessary to exchange data (packets) among the user equipment UE, the control station MME, and the gateway GW, and therefore establishment of the data bearer (aforementioned step S20) is necessary. Consequently, after establishment of the data bearer (S20), the SIP procedure is executed to start the voice communication session (S30), and then the voice bearer is established (S40).

For starting voice communication, first, establishment of the RRC connection (S10) and establishment of the data bearer (S20) are executed. These operations are the same as those for the aforementioned start of data communication, and thus description thereof is omitted.

When the data bearer is established, the control station MME conducts the SIP procedure to start the voice communication session for the user equipment UE that will execute voice communication (S30). The voice communication session triggered by the SIP procedure is a logical connection for associating the originator's application (for example, phone talking application) and the receiver's application. Particulars of the SIP procedure are stated in RFC 3621 (Request For Comments 3621) of the IETF (Internet Engineering Task Force).

In the SIP procedure, control messages necessary for starting the session are exchanged between the user equipment UE and the node at the other end via the data bearer. The base station eNB forwards the control messages for the SIP procedure while recognizing them as only data packets. In other words, the base station eNB does not recognize the fact that the SIR procedure is being executed via the base station eNB itself.

After starting the voice communication session, the voice bearer is established at step S40. Specifically, the control station MME sends an E-RAB Setup Request message for establishing the voice bearer to the base station eNB (S41). Upon receiving the E-RAB Setup Request message, the base station eNB (the bearer establisher 236) sends an RRC connection Reconfiguration message to the user equipment UE (S42). In accordance with the RRC connection Reconfiguration message, the user equipment UE updates updates radio resource control settings of the user equipment UE itself, and then sends an RRC connection Reconfiguration Complete message to the base station eNB (S43). Upon receiving the RRC connection Reconfiguration Complete message, the base station eNB (the bearer establisher 236) sends an E-RAB Setup Response message to the control station MME (S44), and the establishment of the voice bearer is completed. This sequence is described in the 3GPP specifications (for example, 3GPP TS 36.331 V10.3.0 (2011 September) and 3GPP TS 36.413 V10.4.0 (2011 December).

After completion of the establishment of the voice bearer, the user equipment UE starts voice communication with the node at the other end via the voice bearer.

2-3. Band Dispersion Control

Under control by the base station eNB and the control station MME, the user equipment UE is capable of changing the radio access point from the currently connected base station eNB (for example, the first base station eNB1) to another base station eNB (for example, the second base station eNB2). In other words, the user equipment UE can be handed over. The criterion for handover may be reception qualities from the base stations eNB. For example, when the user equipment UE is connected with the first base station eNB1, if the reception quality from the second base station eNB2 is in excess of that from the first base station eNB1, handover is executed in which the access point for the user equipment UE is changed from the first base station eNB1 to the second base station eNB2. A handover in which the frequency used by the source base station eNB is different from that used by the target base station TeNB is referred to as an Inter Frequency Handover.

However, even if a handover is executed on the basis of reception qualities, there is no guarantee that the radio communication environment for the user equipment UE will be improved. For example, if congestion occurs in the handover-target base station eNB (access point base station TeNB), the transmission rate for the user equipment UE (and thus, the throughput in the radio communication system 1) may be deteriorated after handover even if the reception quality of radio waves from the access point base station TeNB to the user equipment UE is high. Conversely, the transmission rate for the user equipment UE (and thus, the throughput in the radio communication system 1) may be improved after handover if the user equipment UE is handed over from a congested base station eNB to a base station eNB that is not congested although reception quality from it is low.

Accordingly, the inventors have considered handover control based on congestion levels in base stations eNB. In the following description, handover based on congestion levels may be referred to as "band dispersion" because of the feature in which base stations eNB to which user equipments UE should be connected (in other words, frequency bands used for radio communication) are selected (dispersed) in accordance with congestion levels in base stations eNB.

Data communication in a packet switching network has characteristics that the amount of data packets to be transmitted in a unit time is likely to vary, delay of data packets is relatively permissible, and so on. On the other hand, voice communication in a packet switching network has characteristics that the number of voice packets to be transmitted in a unit time hardly varies, delay of voice packets is impermissible for realtime communication, and so on. Accordingly, the required quality of service (QoS) is different for voice communication and data communication of the user equipment UE, and thus it is appreciated that band dispersion be controlled in accordance with the type of communication (voice communication and data communication).

Figure 8:
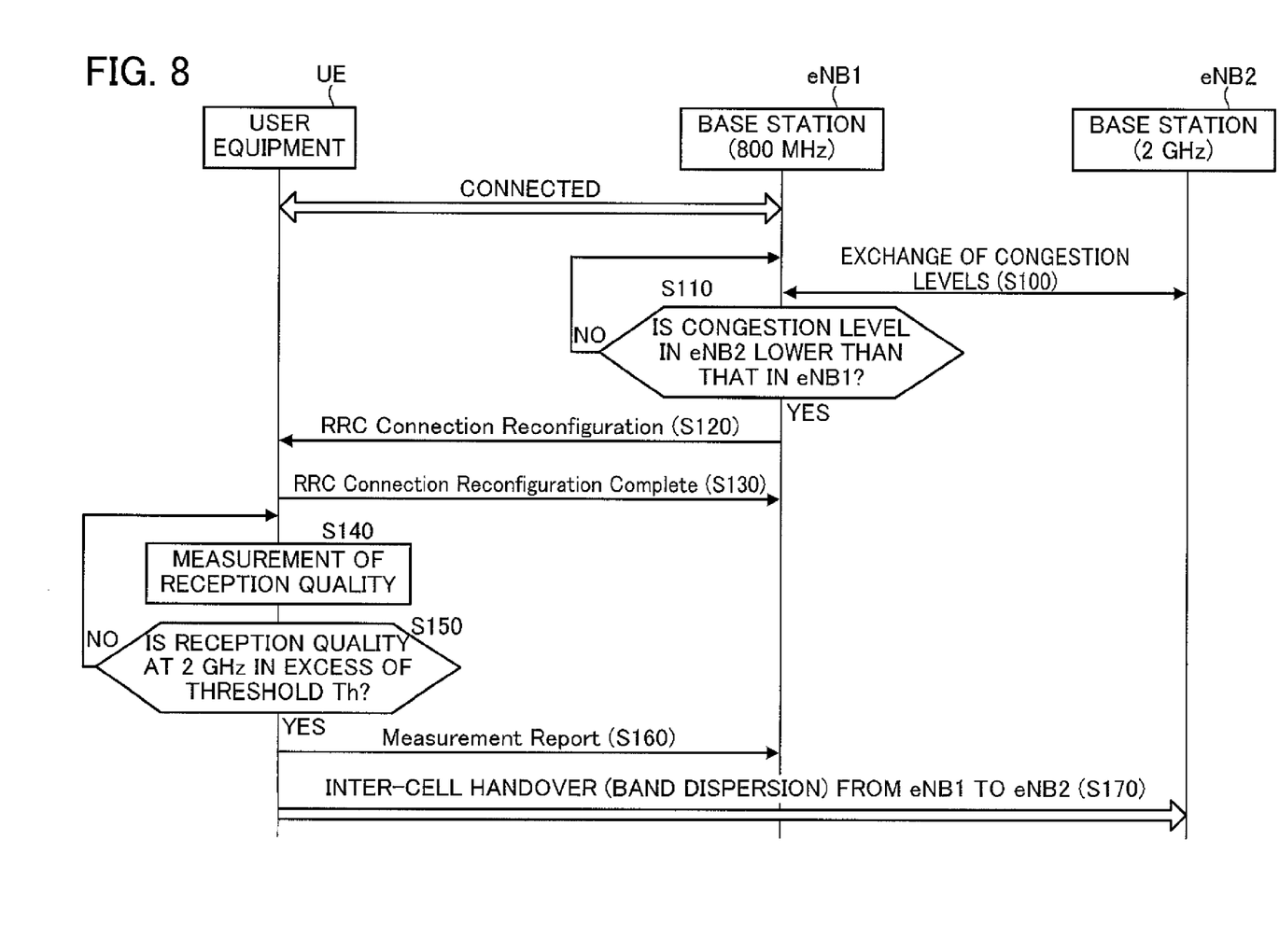
FIG. 8 is a sequence diagram showing a handover (band dispersion) based on congestion levels.

FIG. 8 shows an example of an operational sequence of the band dispersion. In the description of FIG. 8, let us assume that the user equipment UE is initially connected wirelessly with the first base station eNB1. The congestion level determiner 232 of each base station eNB transmits the determined congestion level of the base station eNB (for example, the number of user equipments UE wirelessly accessing to the base station eNB, usage ratio of radio resources in the base station eNB, etc.) to another base station eNB, and receives the congestion level of another base station eNB (S100). In other words, each base station eNB always knows the congestion levels of the base station eNB and neighboring base stations eNB.

The measurement instructor 234 of the first base station eNB1 decides whether or not the congestion level in the second base station eNB2 is lower than that in the first base station eNB1 (S110). If the congestion level in the second base station eNB2 is lower than that in the first base station eNB1 (if the decision at S110 is YES), the measurement instructor 234 sends an RRC connection Reconfiguration message to the user equipment UE wirelessly accessing to the base station eNB (S120), the RRC connection Reconfiguration message instructing the user equipment UE to measure reception quality of radio waves at the frequency (2 GHz) corresponding to the second base station eNB2 and to report the reception quality to the first base station eNB1 if the measured reception quality is in excess of a threshold Th (if a predetermined Event Trigger condition is satisfied). In accordance with the RRC connection Reconfiguration message received from the first base station eNB1, the user equipment UE changes settings of the user equipment UE itself, and sends an RRC connection Reconfiguration Complete message indicating that the change has been completed to the first base station eNB1 (S130). Then, on the basis of the settings (i.e., in accordance with instructions from the measurement instructor 234 of the first base station eNB1), the user equipment UE measures the reception quality of radio waves at 2 GHz transmitted from the second base station eNB2 (S140). The user equipment UE decides whether or not the measured reception quality is in excess of the threshold Th (S150). If the reception quality is in excess of the threshold Th (if the Event Trigger condition is satisfied and the decision at S150 is YES), the user equipment UE puts the reception quality in a Measurement Report message and sends the Measurement Report message to the first base station eNB1 (S160). If the reception quality is equal to or less than the threshold Th (if the decision at S150 is NO), the user equipment UE returns to step S140 to measure the reception quality.

Instead of the above structure in which reception quality is reported only when it is in excess of the threshold Th, the user equipment UE may always (periodically) report the reception quality of radio waves corresponding to the second base station eNB2.

Upon receiving the Measurement Report message (i.e., report of reception quality) from the user equipment UE, the access point controller 240 of the first base station eNB1 selects the second base station eNB2 of which the congestion level is lower as the access point base station TeNB for the user equipment UE, and indicates the second base station eNB2 to the user equipment. On the basis of control by the first base station eNB1, the user equipment UE executes inter-cell handover (band dispersion) from the first base station eNB1 to the second base station eNB2 (S170). By virtue of the aforementioned band dispersion, the user equipment UE can be handed over to a base station eNB at which the congestion level is lower.

In the above description, the user equipment UE wirelessly connected to the first base station eNB1 is handed over to the second base station eNB2. It will be appreciated that the user equipment UE wirelessly connected to the second base station eNB2 may be handed over to the first base station eNB1.

In the above-described band dispersion, when the user equipment UE is executing voice communication, it is preferable that the decision be made at step S110 with the use of the voice congestion level. Conversely, when the user equipment UE is executing data communication, it is preferable that the decision be made at step S110 with the use of the data congestion level.

3. Problems and Solutions of Band Dispersion in Packet Switching Network

However, if the operations for establishment of bearers (FIGS. 6 and 7) at the communication start are combined with the aforementioned band dispersion (FIG. 8), there will occur problems as stated below.

Figure 9:
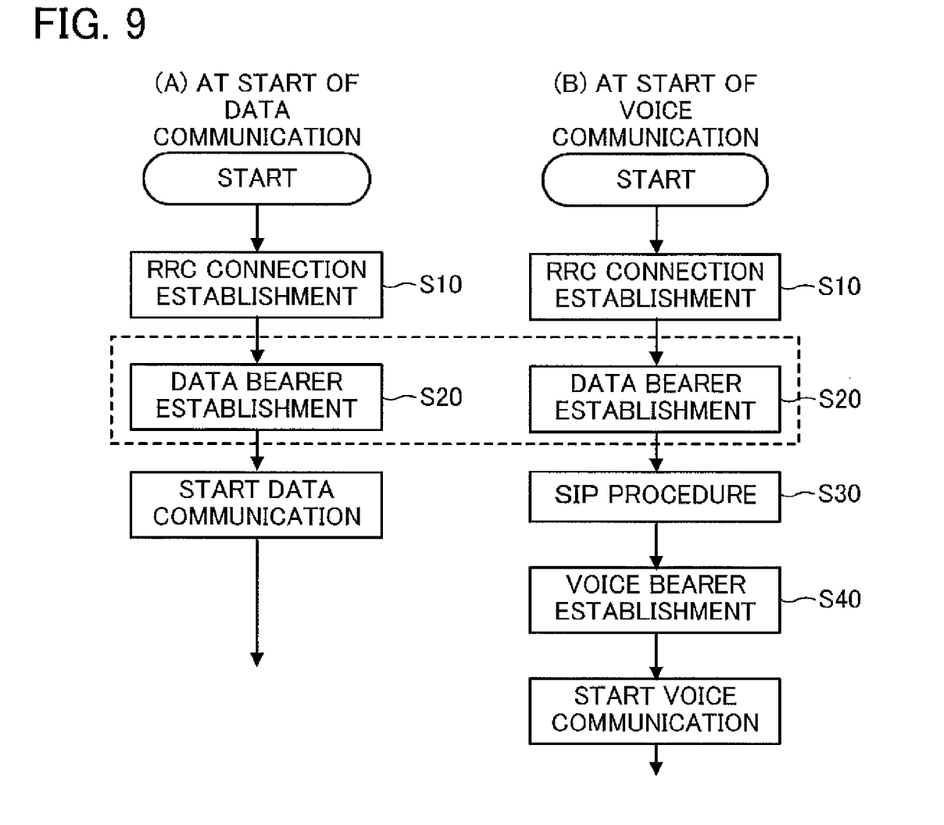
FIG. 9 is a chart in which the bearer establishment operation at the start of data communication is compared with the bearer establishment operation at the start of voice communication.

FIG. 9 is a chart in which the bearer establishment operation at the start of data communication is compared with the bearer establishment operation at the start of voice communication. As described above, the operations up to the RRC connection establishment (S10) and the data bearer establishment (S20) are common. However, data communication can be started directly after the data bearer establishment, whereas voice communication cannot be started until the SIP procedure (S30) and the voice bearer establishment (S40) even after the data bearer establishment. Then, after the data bearer establishment has been completed, the base station eNB cannot distinguish whether the started communication is data communication or voice communication. As described above, the control message exchanged for the SIP procedure are no more than data packets for the base station eNB, so that the base station eNB cannot detect execution of the SIP procedure to decide the start of voice communication. Thus, it is difficult for the base station eNB to decide whether the voice congestion level and the data congestion level should be used for executing the band dispersion at the time point after the data bearer establishment (S20) has been completed.

Figure 10:
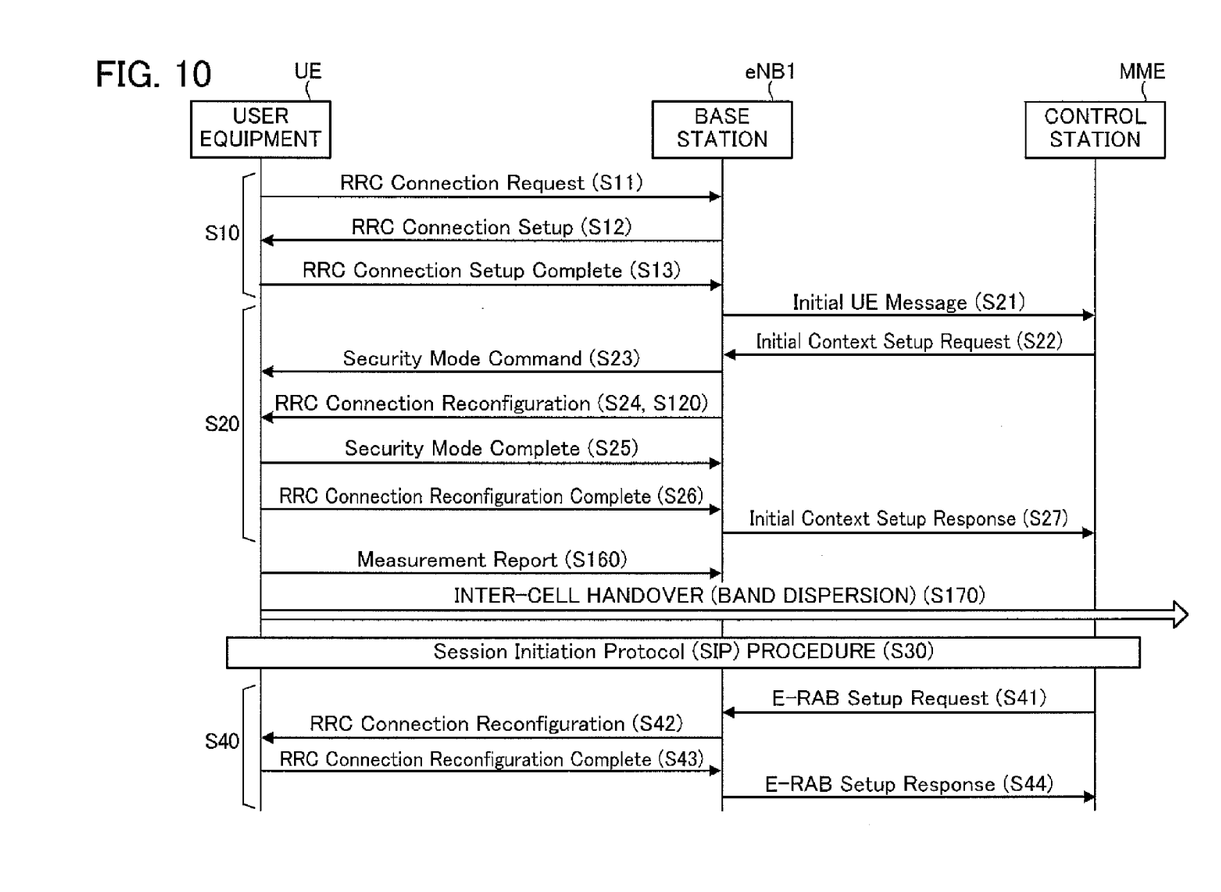
FIG. 10 is sequence diagram showing an operation in which bearer establishment at the start of communication is combined with the band dispersion.

With reference to FIG. 10, another problem that may occur when the band dispersion is executed directly after the data bearer establishment will be described. The RRC connection establishment (S10) is the same as that in FIGS. 6 and 7. As described above, for carrying out the band dispersion, it is necessary to send the RRC connection Reconfiguration message to the user equipment UE for instructing the user equipment UE to measure reception quality of radio waves corresponding to another base station eNB and to report the reception quality to the serving base station eNB if the measured reception quality is in excess of the threshold Th (S120 in FIG. 8). The instructions are included in the RRC connection Reconfiguration message sent to the user equipment UE (S24) in the data bearer establishment operation (S20).

In FIG. 10, the user equipment UE executes, in parallel to the data bearer establishment operation, measurement and report of reception quality in accordance with the RRC connection Reconfiguration message (S140 to S160, but only step S160 is shown for the convenience of illustration). As a result, inter-cell handover (band dispersion) (S170) on the basis of the congestion level may be executed before or during the SIP procedure (S30).

In the SIP procedure, control messages necessary for starting the session are exchanged between the user equipment UE and the node at the other end via the data bearer. Therefore, if band dispersion (handover) is executed during the SIP procedure, it is possible that it will take a long time to start a voice communication session, or the start of a voice communication session will fail by failure of the handover. In addition, let us assume an example in which the user equipment UE wirelessly connected with the first base station eNB1 will execute voice communication, and in which data congestion level in the second base station eNB2 is lower, whereas voice congestion level in the first base station eNB1 is lower. In this case, the user equipment UE is handed over to the second base station eNB2 after establishment of the data bearer, and it is also handed over to the first base station eNB1 after establishment of the voice bearer. Since the successful percentage of handover is not 100%, execution of the above-mentioned unnecessary handover may increase the probability of call disconnection by handover failure.

Figure 11:
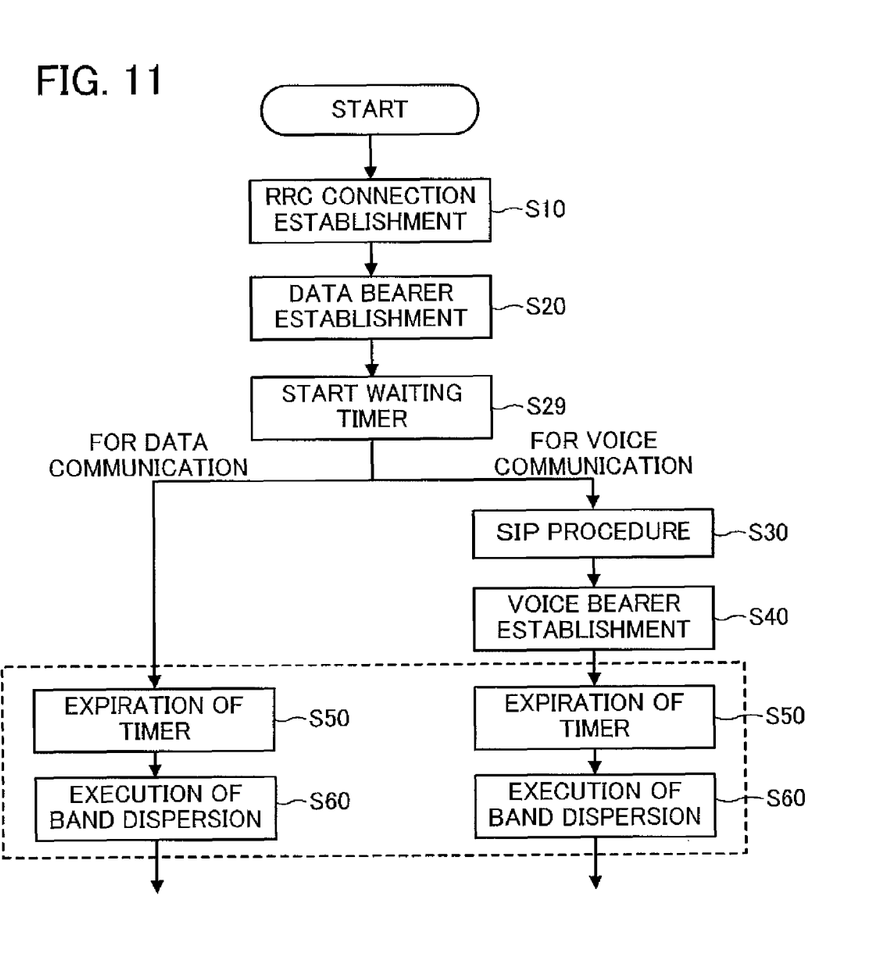
FIG. 11 is flow diagram showing band dispersion according to an embodiment of the present invention.

Thus, it is preferable that the band dispersion not be executed directly after the data bearer establishment. Band dispersion control should not be executed at the completion of the data bearer establishment (S20), and it is more preferable that the band dispersion control be executed at the time point when it is determined that only the data bearer is established or both the data bearer and the voice bearer are established. FIG. 11 shows a specific example of such band dispersion control.

In FIG. 11, the RRC connection establishment (S10) and the data bearer establishment (S20) are the same as those in the above-described architecture of FIG. 10. The waiting timer section 238 of the base station eNB starts a waiting timer (S29) after the establishment of the data bearer, the waiting timer expiring after passage of a time T. It is preferable that the expiration time T of the timer be determined in accordance with a time period that is necessary for establishment of the voice bearer after the establishment of the data bearer. The time T may be freely decided. For example, the time T may be decided as a time period actually needed for the voice bearer establishment in an experimental environment in which the radio communication system 1 is actually reproduced, may be decided on the basis of a simulation results in a virtual radio communication system constructed on a computer, or may be decided on the basis of measurement data in the radio communication system 1 actually operating.

After expiration of the timer (S50) started by the waiting timer section 238, the access point controller 240 of the base station eNB executes band dispersion (S60, i.e., S140 to S170 in FIG. 8) depending on the type of communication executed by the user equipment UE. In other words, if the voice bearer has been established, the access point controller 240 selects the access point base station TeNB for the user equipment UE on the basis of the voice congestion levels, and indicates the access point base station to the user equipment UE. If the voice bearer has not been established, the access point controller 240 selects the access point base station TeNB for the user equipment UE on the basis of the data congestion levels, and indicates the access point base station to the user equipment UE. In accordance with the indication by the base station eNB, the user equipment UE executes inter-cell handover.

With such a structure, when the user equipment UE executes voice communication, band dispersion is conducted on the basis of voice congestion levels, whereas when the user equipment UE executes data communication, band dispersion is conducted on the basis of data congestion levels. In other words, depending on the type of communication (voice communication and data communication), the access point base station TeNB for the user equipment UE is selected. Therefore, the throughput in the radio communication system 1 may be enhanced. In addition, by virtue of standing by for the band dispersion with the use of the waiting timer, it is possible to prevent multiple inter-cell handovers that might occur before and after the voice bearer establishment and to prevent an inter-cell handover that might occur during the SIP procedure (at the start of voice communication session). As a result, call disconnection caused by band dispersion can be restricted.

4. Modifications

Various modifications may be applied to the above-described embodiment. Specific modifications are exemplified below. Two or more modifications selected from among the following may be combined.

(1) Modification 1

In the above-described embodiment, the first base station eNB1 uses radio waves at the 800 MHz frequency band for wireless communication, whereas the second base station eNB2 uses radio waves at the 2 GHz frequency band for wireless communication. However, it is understood that the above-described frequencies are for illustrative purpose only, and any other frequencies (the frequency band and the center frequency) may be adopted. In particular, with respect to the frequency (first frequency) used by the first base station eNB1 and the frequency (second frequency) used by the second base station eNB2, the frequency band used by the first base station eNB1 may be the same as that used by the second base station eNB2, whereas the center frequency for the first base station eNB1 may be different from that for the second base station eNB2. For example, the frequency band of the first frequency and the frequency band of the second frequency are commonly the 2 GHz frequency band, but the center frequency of the first frequency may be 2130 MHz, whereas the center frequency of the second frequency may be 2140 MHz.

In addition, in the structure of the above-described embodiment, the frequency (first frequency) used by the first base station eNB1 may be the same as the frequency (second frequency) used by the second base station eNB2. More specifically, the frequency band and the center frequency of the first frequency may be the same as those of the second frequency. When the user equipment UE is located at the cell boundary in which the first cell C1 formed by the first base station eNB1 and the second cell C2 formed by the second base station eNB2 overlap, selection of the access point base station (inter-cell handover) may be executed in accordance with the congestion levels of the base stations.

(2) Modification 2

In the above-described embodiment, the first base station eNB1 and the second base station eNB2 are different apparatuses. However, a single base station eNB may include the functions of the first base station that can communicate with the user equipment UE at the first frequency and the functions of the second base station that can communicate with the user equipment UE at the second frequency that are different from the first frequency.

(3) Modification 3

In the above-described embodiment, communication (data communication or voice communication) is triggered by a request from the user equipment UE. However, it will be appreciated that communication (data communication or voice communication) may be triggered by a request from the side of the core network EPC (for example, the control station MME) for example when call origination is made by another user equipment UE.

(4) Modification 4

The user equipment UE may be any type of device that can perform radio communication with the base station eNB. The user equipment UE may be, for example, a cell phone terminal, a desktop-type personal computer, a laptop personal computer, a UMPC (ultra-mobile personal computer), a portable game machine, or another radio terminal.

(5) Modification 5

In each of the nodes in radio communication system 1 (the user equipment UE, the base stations eNB, the control station MME, etc.) functions executed by the CPU may be executed by hardware or a programmable logic device, such as an FPGA (Field Programmable Gate Array) or a DSP (Digital Signal Processor), instead of the CPU.

REFERENCE SYMBOLS

1: Radio Communication System
110: Radio Communicator
120: Controller
210: Radio Communicator
220: Network Communicator
230: Controller
232: Congestion Level Determiner
234: Measurement Instructor
236: Bearer Establisher
238: Waiting Timer Section
240: Access Point Controller
242: Communication Controller
310: Network Communicator
320: Controller
C (C1, C2): Cell
eNB (eNB1, eNB2): Base Station
EPC: Core Network
GW: Gateway
MME: Control Station
PDN: Packet Data Network
QoS: Quality of Service
RN: Radio Network
T: Time
TeNB: Access Point Base Station
Th: Threshold
UE: User Equipment.

The invention claimed is:

1. A radio communication system comprising:
at least one user equipment configured to execute voice communication and data communication by exchanging packets;
multiple base stations each configured to execute wireless communication with the user equipment; and
a control station configured to control establishment of bearers and sessions used for communication of the user equipment executed via the base stations,
the base station comprising:
a radio communicator configured to execute radio communication with the user equipment;

a network communicator configured to execute communication with the control station and another base station;

a congestion level determiner configured to determine a voice congestion level indicating a degree of congestion of voice communication in the base station, and to determine a data congestion level indicating a degree of congestion of data communication in the base station;

a bearer establisher configured to establish a data bearer to be used for data communication and a voice bearer to be used for voice communication on the basis of control by the control station;

a waiting timer section configured to start a timer after establishment of the data bearer, the timer expiring after passage of a predetermined time; and an access point controller configured to select an access point base station for the user equipment on the basis of the congestion level in the base station and the congestion level in another base station, and to indicate the access point base station to the user equipment, the control station configured to, when the user equipment executes voice communication, start voice communication session for the user equipment after the bearer establisher of the base station establishes the data bearer, and to control the bearer establisher of the base station to establish the voice bearer after starting the voice communication session, the access point controller of the base station configured to, after expiration of the timer started by the waiting timer section, select the access point base station for the user equipment on the basis of the voice congestion levels and indicate the access point base station to the user equipment if the voice bearer has been established, the access point controller of the base station configured to, after expiration of the timer started by the waiting timer section, select the access point base station for the user equipment on the basis of the data congestion levels and indicate the access point base station to the user equipment if the voice bearer has not been established.

2. The radio communication system according to claim 1, wherein the multiple base stations comprise a first base station configured to execute wireless communication with the user equipment at a first frequency and a second base station configured to execute wireless communication with the user equipment at a second frequency, each of the base stations comprising a measurement instructor configured to instruct the user equipment wirelessly connected to the base station to measure reception quality from at least one base station, the measurement instructor of the first base station configured to instruct the user equipment wirelessly connected to the first base station to measure reception quality of radio waves at the second frequency corresponding to the second base station in a case in which the congestion level in the second base station is lower than that in the first base station, the measurement instructor of the first base station configured to instruct the user equipment wirelessly connected to the first base station to report the reception quality to the first base station in a case in which the reception quality is in excess of a predetermined threshold, the user equipment configured to measure the reception quality of radio waves at the second frequency in accordance with instruction by the measurement instructor, and to report the reception quality to the first base station in a case in which the reception quality is in excess of the predetermined threshold, the access point controller of the first base station configured to select the second base station as the access point base station for the user equipment and to indicate the second base station to the user equipment in a case in which the first base station receives the report of the reception quality.

3. The radio communication system according to claim 2, wherein the first frequency and the second frequency are different.

4. The radio communication system according to claim 1, wherein the predetermined time that the timer expires is determined in accordance with a time period that is necessary for establishment of the voice bearer after the establishment of the data bearer.

5. A base station in a radio communication system, comprising:

at least one user equipment configured to execute voice communication and data communication by exchanging packets;

multiple base stations each configured to execute wireless communication with the user equipment; and a control station configured to control establishment of bearers and sessions used for communication of the user equipment executed via the base stations, the base station comprising:

a radio communicator configured to execute radio communication with the user equipment;

a network communicator configured to execute communication with the control station and another base station;

a congestion level determiner configured to determine a voice congestion level indicating a degree of congestion of voice communication in the base station, and to determine a data congestion level indicating a degree of congestion of data communication in the base station;

a bearer establisher configured to establish a data bearer to be used for data communication and a voice bearer to be used for voice communication on the basis of control by the control station;

a waiting timer section configured to start a timer after establishment of the data bearer, the timer expiring after passage of a predetermined time; and an access point controller configured to select an access point base station for the user equipment on the basis of the congestion level in the base station and the congestion level in another base station, and to indicate the access point base station to the user equipment, the bearer establisher configured to, when the user equipment executes voice communication, establish the voice bearer on the basis of control by the control station executed after establishment of the data bearer and starting voice communication session for the user equipment, the access point controller configured to, after expiration of the timer started by the waiting timer section, select the access point base station for the user equipment on the basis of the voice congestion levels and indicate the access point base station to the user equipment if the voice bearer has been established, the access point controller configured to, after expiration of the timer started by the waiting timer section, select the access point base station for the user equipment on the basis of the data congestion levels and indicate the access point base station to the user equipment if the voice bearer has not been established.

6. The base station according to claim 5, wherein the base station is a first base station among a first base station and a second base station, wherein the first base station is configured to execute wireless communication with the user equipment at a first frequency and the second base station is configured to execute wireless communication with the user equipment at a second frequency, the base station comprising a measurement instructor configured to instruct the user equipment wirelessly connected to the base station to measure reception quality from at least one base station, the measurement instructor configured to instruct the user equipment wirelessly connected to the first base station to measure reception quality of radio waves at the second frequency corresponding to the second base station in a case in which the congestion level in the second base station is lower than that in the first base station, the measurement instructor configured to instruct the user equipment wirelessly connected to the first base station to report the reception quality to the first base station in a case in which the reception quality is in excess of a predetermined threshold, the access point controller configured to select the second base station as the access point base station for the user equipment and to indicate the second base station to the user equipment in a case in which the base station receives the report of the reception quality.

7. The base station according to claim 6, the first frequency and the second frequency are different.

8. The base station according to claim 5, wherein the predetermined time that the timer expires is determined in accordance with a time period that is necessary for establishment of the voice bearer after the establishment of the data bearer.

* * * * *

UNITED STATES PATENT AND TRADEMARK OFFICE
CERTIFICATE OF CORRECTION

| | |
|---|---|
| PATENT NO. | : 9,215,618 B2 |
| APPLICATION NO. | : 14/366202 |
| DATED | : December 15, 2015 |
| INVENTOR(S) | : Yusuke Sasaki et al. |

Page 1 of 1

It is certified that error appears in the above-identified patent and that said Letters Patent is hereby corrected as shown below:

In the Claims:

At column 15, claim number 1, line number 28, "the waiting tinier" should read -- the waiting timer --.

Signed and Sealed this
Fifth Day of April, 2016

Michelle K. Lee
*Director of the United States Patent and Trademark Office*